United States Patent
Hokuf et al.

(10) Patent No.: US 7,602,302 B2
(45) Date of Patent: Oct. 13, 2009

(54) ANIMAL TRACKING APPARATUS AND METHOD

(75) Inventors: Bronson D. Hokuf, Gardner, KS (US); Henry J. Straub, Olathe, KS (US); James R. Kummer, Paola, KS (US)

(73) Assignee: Garmin Ltd. (KY)

( * ) Notice: Subject to any disclaimer, the term of this patent is extended or adjusted under 35 U.S.C. 154(b) by 259 days.

(21) Appl. No.: 11/463,262

(22) Filed: Aug. 8, 2006

(65) Prior Publication Data

US 2008/0036610 A1    Feb. 14, 2008

(51) Int. Cl.
*G08B 23/00* (2006.01)

(52) U.S. Cl. .............. 340/573.3; 340/573.2; 340/573.7; 340/539.13; 340/686.1

(58) Field of Classification Search .................. 340/573, 340/573.3, 573.2, 539.13, 686.1
See application file for complete search history.

(56) References Cited

U.S. PATENT DOCUMENTS

| | | | |
|---|---|---|---|
| 5,689,269 A | | 11/1997 | Norris |
| 5,815,077 A | * | 9/1998 | Christiansen ............ 340/573.3 |
| 5,857,433 A | | 1/1999 | Files |
| 5,886,672 A | | 3/1999 | Brune et al. |
| 5,923,254 A | | 7/1999 | Brune |
| 5,942,969 A | | 8/1999 | Wicks |
| 5,952,959 A | | 9/1999 | Norris |
| 6,114,957 A | | 9/2000 | Westrick et al. |
| 6,172,640 B1 | | 1/2001 | Durst et al. |
| 6,236,358 B1 | | 5/2001 | Durst et al. |
| 6,320,495 B1 | | 11/2001 | Sprogis |
| 6,374,179 B1 | | 4/2002 | Smith et al. |
| 6,421,001 B1 | | 7/2002 | Durst et al. |
| 6,441,778 B1 | | 8/2002 | Durst et al. |
| 6,480,147 B2 | | 11/2002 | Durst et al. |
| 6,518,919 B1 | | 2/2003 | Durst et al. |
| 6,720,879 B2 | * | 4/2004 | Edwards .................. 340/573.3 |
| 6,771,213 B2 | | 8/2004 | Durst et al. |
| 6,859,171 B2 | | 2/2005 | Durst et al. |
| 6,932,698 B2 | | 8/2005 | Sprogis |
| 2002/0006825 A1 | | 1/2002 | Suzuki |

(Continued)

FOREIGN PATENT DOCUMENTS

JP          10216361          8/1998

(Continued)

OTHER PUBLICATIONS

"Satellites keep moving targets in their sights", The Scotsman, Jul. 1, 1994.

(Continued)

*Primary Examiner*—Benjamin C Lee
*Assistant Examiner*—Ojiako Nwugo
(74) *Attorney, Agent, or Firm*—Samuel M. Korte

(57) ABSTRACT

Embodiments of the present invention provide a tracking apparatus (100) and method that are operable to efficiently track an animal. The tracking apparatus (100) is operable to be worn by an animal, determine its current geographic location, and transmit information relating to its current geographic location to an external device such as a portable navigation unit (200). The navigation unit (200) is operable to display a representation of the geographic location of the tracking apparatus (100) for consideration by a user.

23 Claims, 7 Drawing Sheets

U.S. PATENT DOCUMENTS

| | | | |
|---|---|---|---|
| 2002/0090985 A1 | 7/2002 | Tochner et al. | |
| 2003/0036428 A1 | 2/2003 | Aasland | |
| 2003/0134665 A1 | 7/2003 | Kato et al. | |
| 2005/0091110 A1* | 4/2005 | Hentz et al. | 705/14 |
| 2006/0097882 A1* | 5/2006 | Brinkerhoff et al. | 340/573.2 |
| 2006/0155172 A1* | 7/2006 | Rugg | 600/300 |
| 2006/0161379 A1* | 7/2006 | Ellenby et al. | 702/150 |
| 2006/0258914 A1* | 11/2006 | Derchak et al. | 600/300 |
| 2006/0270421 A1* | 11/2006 | Phillips et al. | 455/457 |

FOREIGN PATENT DOCUMENTS

| | | | |
|---|---|---|---|
| JP | 2002273034 A | 9/2002 | |
| JP | 2002273035 A | 9/2002 | |
| JP | 2002273054 A | 9/2002 | |

OTHER PUBLICATIONS

Ball, Gary, "They're not yet on the Internet", Outdoor Canada, pp. 42-45 and 65, Sep. 1995.

Dawson, Blair, "Spy in the sky assists moose researchers", Ontario Out of Doors, pp. 37-38, Jun. 1997.

Meadows, Bryan, "Tracking newest tool in moose management", Chronicle-Journal/Times News, Feb. 4, 1996.

Mitchell, Jared, "Canadian innovators collar caribou and put eco-friendly bacteria to work", Report on Business Magazine, p. 89, Sep. 1994.

Piekarski, Wayne et al., "Integrating Virtual and Augmented Realities in an Outdoor Application", 2nd IEEE and ACM International Workshop on Augmented Reality, Oct. 20-21, 1999, San Francisco, California.

Piekarski, Wayne et al., "ARQuake: The Outdoor Augmented Reality Gaming System", Communications of the ACM, Jan. 2002, vol. 45, No. 1, p. 36-38.

Powell, Rachel, "Tech Notes; the Latchkey Cats", The New York Times, p. 9, Nov. 17, 1991.

Power, John, "Moose tracking goes high-tech with new system", The Toronto Star, p. B7, Jul. 16, 1994.

Strauss, Stephen, "New devices cast light on fish lifestyles", The Globe and Mail, p. A10, Sep. 4, 1997.

Thomas, Bruce et al. "ARQuake: An Outdoor/Indoor Augmented Reality First Person Application", Fourth International Symposium on Wearable Computers, Oct. 18-21, 2000, Atlanta, Georgia.

Thomas, Bruce et al., "First person Indoor/Outdoor Augmented Reality Application: ARQuake", Personal and Ubiquitous Computing, 2002, 6:75-86.

Trimble, Andrew, "Collaring the market for tracking animals award-winning company makes computerized devices to put on anything from mice to moose", The Toronto Star, p. F5, Dec. 26, 1994.

Printout from http://wildlifematerials.com/dog/products/receivers.php 2 pages, printed Aug. 18, 2006.

Printout from http://wildlifematerials.com/dog/products/transmitters.php, 3 pages, printed Aug. 18, 2006.

Printout from http://www.environmental-studies.de/products/GPS-GSM-doq-collar/dog-1.html, 10 pages, printed Aug. 18, 2006.

Printout from http://www.globalpetfinder.com/, 1 page, printed Aug. 18, 2006.

Printout from http://express-press-release.com/27/CELLULAR%20WRIST-WATCH%20for%20 KIDS1%20%20%20%20GL%20GPS-911.php, 3 pages, printed Oct. 9, 2006.

Printout from http://www.gundogsupply.com/trackerclassic.html, 3 pages, printed Aug. 18, 2006.

Printout from http://www.gundogsupply.com/tracmaxduowi1.html, 2 pages, printed Aug. 18, 2006.

Printout from http://www.locatis.ch/index/php?id_menu1=50&SESSID=0ab4fb03194f9a93d43416a79e6faee7, 1 page, printed Aug. 18, 2006.

Printout from http://www.petsmobility.net/, 1 page, printed Aug. 18, 2006.

Printout from http://www.pointersolutions.com/eng/hunting_dog_gps technical.htm, 7 pages, printed Aug. 18, 2006.

Printout from http://www.pointersolutions.com/eng/hunting_marathon.htm, 1 page, printed Aug. 18, 2006.

Printout from http://www.pointersolutions.com/eng/pet.htm, 1 page, printed Aug. 18, 2006.

Printout from http://www.surveillance-equip.com/pet.gps.html, 3 pages, printed Aug. 18, 2006.

Printout from http://www.tracedog.fr/1accueil.html, 1 page, printed Aug. 18, 2006.

Printout from http://www.uniquedistributors.com/premtracsys.html, 3 pages, printed Aug. 18, 2006.

Printout from http://www.engadget.com/2005/05/06/guardianlion-com-gps-child-security-device/, 2 pages, printed Oct. 9, 2006.

* cited by examiner

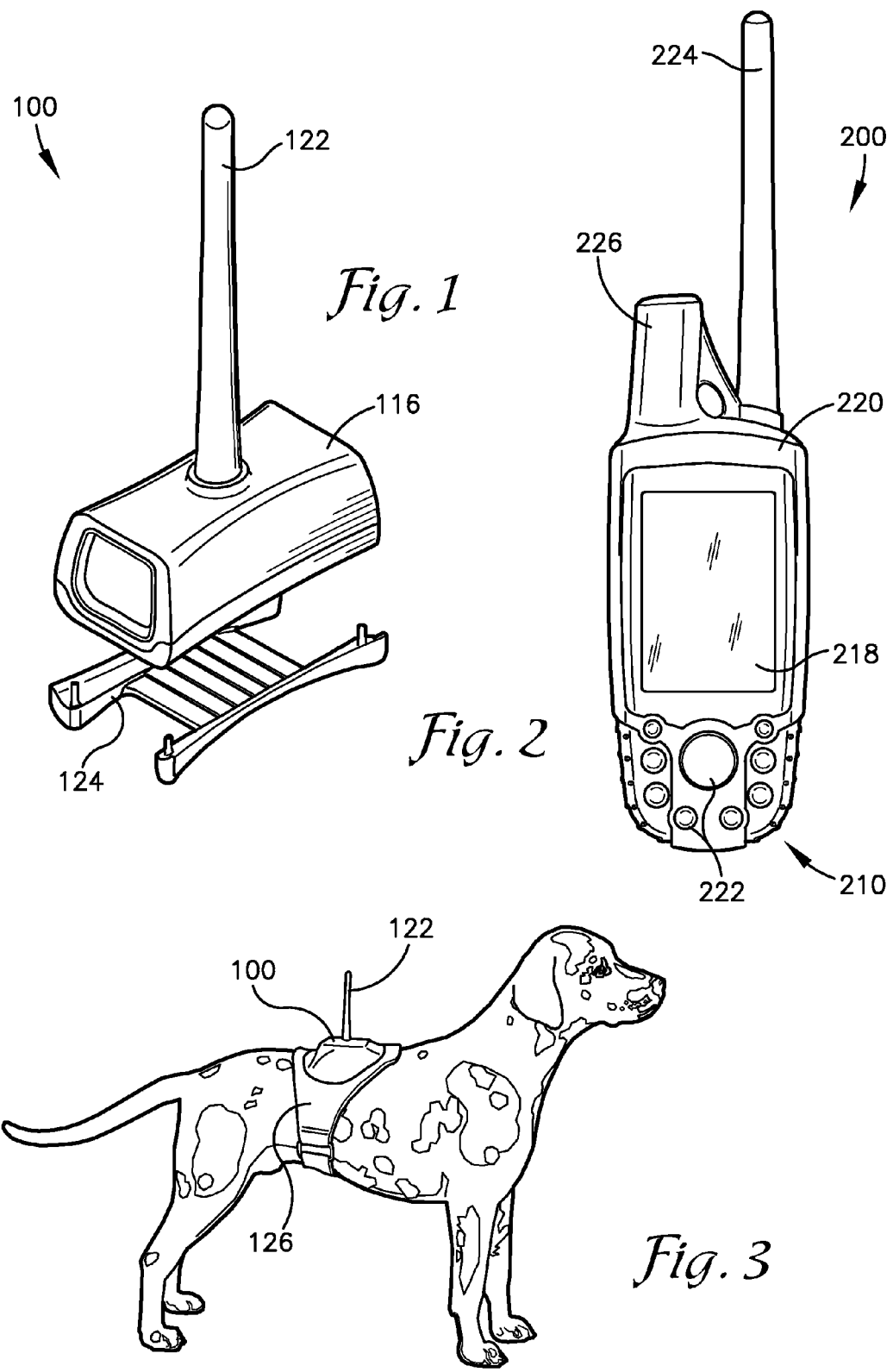

ANIMAL TRACKING APPARATUS AND METHOD

BACKGROUND OF THE INVENTION

1. Field of the Invention

Embodiments of the present invention relate to apparatuses and methods for tracking animals. More particularly, various embodiments of the present invention relate to an animal tracking apparatus that is operable to determine and transmit its current geographic location to a portable navigation unit.

2. Description of the Related Art

It is often desirable to track animals for scientific, personal, or environmental reasons. Pet owners are particularly interested in tracking the location of their pets to ensure that they do not get lost or otherwise harmed. For instance, hunting dogs are often equipped with tracking devices in case the dogs become lost during hunting or training. Conventional tracking devices emit radio frequency signals that may be identified and followed utilizing complex direction finding equipment. Unfortunately, tracking radio frequency signals utilizing direction finding equipment requires transport of bulky and cumbersome directional antennas and does not enable users to quickly determine the precise locations of animals. Alternatively, known animal tracking devices that utilize the Global Positioning System (GPS) only provide limited information.

SUMMARY OF THE INVENTION

Embodiments of the present invention solve the above-described problems and provide a distinct advance in the art of animal tracking. More particularly, embodiments of the present invention provide an animal tracking apparatus that is operable to determine and transmit its current geographic location to a portable navigation unit. Such a configuration enables the navigation unit to generate accurate information corresponding to an animal's location to facilitate tracking of the animal.

In one embodiment, an animal tracking apparatus is provided that is operable to be worn by an animal. The tracking apparatus generally includes a location determining component operable to determine a current geographic location of the apparatus, a sensor operable to sense a condition, a primary communications element, and a housing to house at least portions of the location determining component, the sensor, and the primary communications element. The primary communications element is operable to transmit information relating to the current geographic location of the apparatus and the sensed condition to a remote navigation unit.

In another embodiment the present invention provides an animal tracking system comprising an animal tracking apparatus and a portable navigation unit. The animal tracking apparatus is operable to be worn by an animal and includes a location determining component operable to determine a current geographic location of the apparatus, a primary communications element operable to transmit information relating to the current geographic location of the apparatus, and a housing to house at least portions of the location determining component and the primary communications element. The portable navigation unit generally includes a location determining component operable to determine a current geographic location of the unit, a primary communications element operable to receive the transmitted apparatus location information from the animal tracking apparatus, a memory operable to store information corresponding to cartographic information, a processor operable to generate a representation of the apparatus location and the cartographic information independent of the current geographic location of the unit, and a display operable to display the generated representation.

In another embodiment, the present invention provides an animal tracking apparatus operable to be worn by an animal wearing a collar and a body harness. The tracking apparatus generally includes a location determining component operable to determine a current geographic location of the apparatus, a primary communications element operable to transmit information relating to the current geographic location of the apparatus to a remote navigation unit, and a housing to house at least portions of the location determining component and the primary communications element. The housing is operable to removably couple with both the collar and the body harness.

In another embodiment, the present invention provides a method of tracking an animal. The method generally includes acquiring a current geographic location of the animal, sensing a condition, and transmitting information relating to the current geographic location and the sensed condition to a remote navigation unit.

In another embodiment, the present invention provides a method of tracking an animal utilizing a portable navigation unit. The method generally includes receiving information relating to a current geographic location of the animal, acquiring a current geographic location of the navigation unit, accessing cartographic information, generating a representation of the animal location and the cartographic information independent of the current geographic location of the unit, and displaying the generated representation of the animal location and cartographic information.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 1 is a perspective view of an animal tracking apparatus configured in accordance with various preferred embodiments of the present invention;

FIG. 2 is a front view of a portable navigation unit configured in accordance with various preferred embodiments of the present invention;

FIG. 3 is a perspective view showing the tracking apparatus of FIG. 1 coupled with a dog utilizing a body harness;

Figure 4:
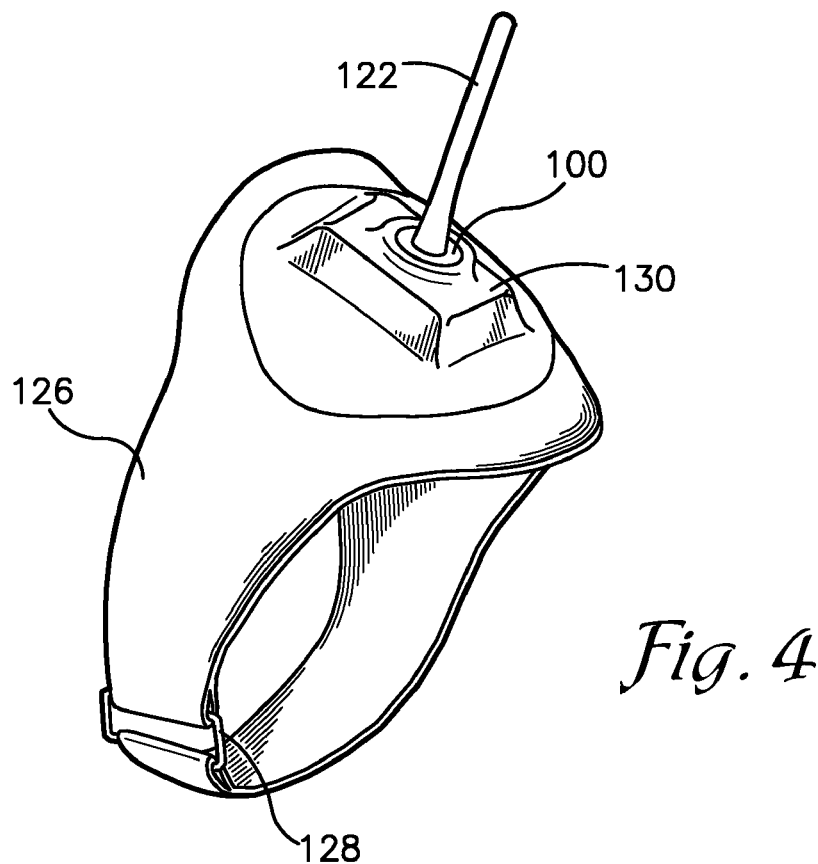
FIG. 4 is a perspective view of the tracking apparatus of FIG. 1 coupled with the body harness of FIG. 3.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

As shown in FIGS. 1-2, embodiments of the present invention are preferably implemented utilizing an animal tracking apparatus 100 and a portable navigation unit 200. As discussed in detail below, the animal tracking apparatus 100 is operable to be mounted to an animal to transmit the location of the animal to the portable navigation unit 200 for consideration by a user. However, in some embodiments, the animal tracking apparatus 100 and/or portable navigation unit 200 are not necessarily utilized in combination as the animal tracking apparatus 100 and/or portable navigation unit 200 may function and exist independently of each other.

The Tracking Apparatus 100

Figure 7:
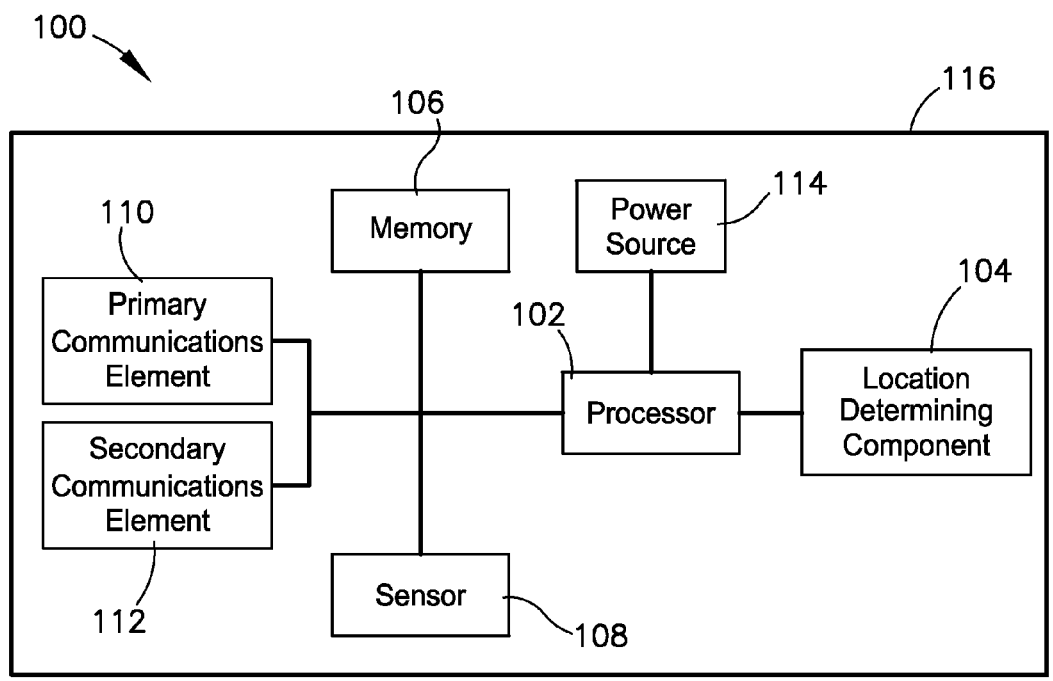
FIG. 7 is a block diagram showing some of the elements of the tracking apparatus of FIG. 1.
Figure 8:
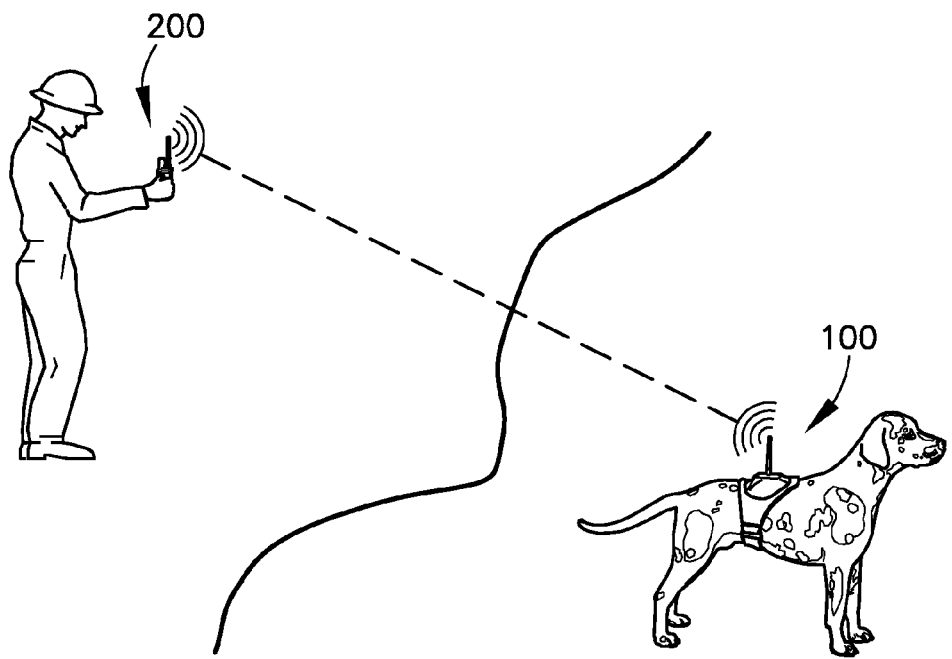
FIG. 8 is a diagram showing the navigation unit of FIG. 2 receiving information from the tracking apparatus of FIG. 1.

The tracking apparatus 100 is generally illustrated in FIGS. 1 and 7. The tracking apparatus 100 may be any portable electronic device that is operable to be coupled with or otherwise be worn by an animal and determine its current geographic location for transmission to an external device. Thus, the tracking apparatus 100 may include portable computing elements, radios, personal data assistants (PDAs), cellular telephones, etc. More preferably, the tracking apparatus 100 is a Global Positioning System (GPS) tracking device manufactured by GARMIN INTERNATIONAL, INC. of Olathe, Kans. However, the tracking apparatus 100 may be any device configured as described herein or otherwise operable to perform the functions described below.

The tracking apparatus 100 preferably includes a processor 102, a location determining component 104 coupled with the processor 102 to facilitate determination of a current geographic location, a memory 106 coupled with the processor 102 and operable to store information, a sensor 108 coupled with the processor 102 and operable to sense a condition, a primary communications element 110 and a secondary communications element 112 operable to communicate with at least one external device, a power source 114 for powering various apparatus 100 elements, and a housing 116 for housing various tracking apparatus 100 elements. The tracking apparatus 100 may also include additional elements, such as an on/off switch (not shown) and/or various light emitting diodes (LEDs) (not shown) for conveying status information to the user.

The processor 102 is preferably coupled with the location determining component 104, memory 106, sensor 108, communications elements 110, 112, and other tracking apparatus 100 elements through wired or wireless connections, such as a data bus, to enable information to be exchanged between the various elements. Further, the processor 102 is preferably operable to control the various functions of the tracking apparatus 100 according to a computer program, including one or more code segments, or other instructions associated with the memory 106 or with various processor logic and structure. The processor 102 may comprise various computing elements, such as integrated circuits, microcontrollers, microprocessors, programmable logic devices, etc, alone or in combination, to perform the operations described herein.

As described below in more detail, the processor 102 may determine a current geographic location of the tracking apparatus 100 by receiving the geographic location from the location determining component 104 or from another device through the communications elements 110, 112. Alternatively, the processor 102 may independently determine geographic locations based on information and/or data, such as received navigation signals, provided by the location determining component 104, stored within the memory 106, or acquired from other devices or elements.

The location determining component 104 is preferably a Global Positioning System (GPS) receiver, and is adapted to provide, in a substantially conventional manner, geographic location information for the tracking apparatus 100. The location determining component 104 may be, for example, a GPS receiver much like those disclosed in U.S. Pat. No. 6,434,485, which is incorporated herein by specific reference. In some embodiments, the location determining component 104 may include a high sensitivity GPS receiver to facilitate determination of the current geographic location of the apparatus 100 when the apparatus 100 is shielded from the sky, such as where the apparatus 100 is in heavy tree cover or brush. However, the location determining component 104 may receive cellular or other positioning signals utilizing other various methods to facilitate determination of geographic locations without being limited to GPS.

As is known in the art, the GPS is a satellite-based radio navigation system that allows determination of navigation information, such as position, velocity, time, and direction, for an unlimited number of users. Formally known as NAVSTAR, the GPS incorporates a plurality of satellites that orbit the earth.

The location determining component 104 preferably scans for GPS satellite signals and, upon receiving signals from at least three different satellites, the location determining component 104 utilizes the three satellite signals to determine its own position. Acquiring a fourth satellite signal will allow the location determining component 104 to calculate its three-dimensional position by the same calculations. As should be appreciated by those skilled in the art, the processor 102 may be operable to perform one or more of these functions in place of the location determining component 104.

Although GPS enabled devices are often used as navigation devices, it will be appreciated that satellites need not be used to determine a geographic position of a receiving unit since any receiving device capable of receiving signals from multiple transmitting locations can perform basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Figure 9:
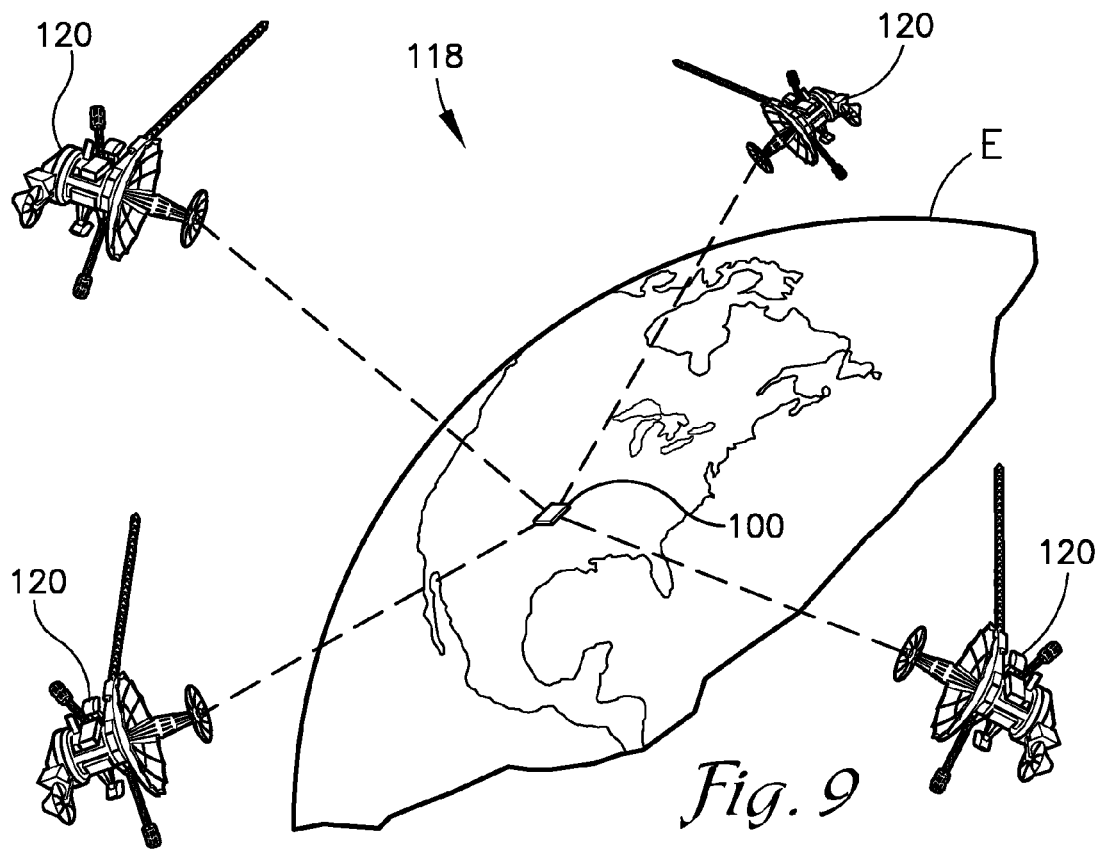
FIG. 9 is diagram of a Global Positioning System (GPS) that may be utilized by various embodiments of the present invention.

FIG. 9 shows one representative view of a GPS denoted generally by reference number 118. A plurality of satellites 120 are in orbit about the Earth E. The orbit of each satellite is not necessarily synchronous with the orbits of other satellites and, in fact, is likely asynchronous. The tracking apparatus 100, including the location determining component 104, is shown receiving GPS satellite signals from the various satellites 120.

The location determining component 104 may also include various processing and memory elements to determine the geographic location of the tracking apparatus 100 itself or it may provide information to the processor 102 to enable the processor 102 to specifically determine the geographic location of the tracking apparatus 100. Thus, the location determining component 104 need not itself calculate the current geographic location of the tracking apparatus 100 based upon received signals. The location determining component 104 also may include an antenna for receiving signals, such as a GPS patch antenna or quadrifilar helical antenna. Preferably, the antenna utilized by the location determining component 104 is enclosed within the housing 116.

Further, the location determining component 104 may be integral with the processor 102 and/or memory 106 such that the location determining component 104 may be operable to specifically perform the various functions described herein. Thus, the processor 102 and location determining component 104 need not be separate or otherwise discrete elements.

In various embodiments the location determining component 104 need not directly determine the current geographic location of the tracking apparatus 100. For instance, the location determining component 104 may determine the current geographic location by receiving information or data utilizing the communications elements 110, 112.

The memory 106 is coupled with the processor 102 and/or other tracking apparatus 100 elements and is operable to store various data utilized by the processor 102 and/or other elements. The memory 106 may include removable and non-removable memory elements such as RAM, ROM, flash, magnetic, optical, USB memory devices, other conventional memory elements, and/or combinations thereof. The memory 106 may also be integral with the processor 102, such as in embodiments where the memory 106 comprises internal cache memory.

The memory 106 may store various data associated with operation of the tracking apparatus 100, such as a computer program, code segments, or other data for instructing the processor 102 and other tracking apparatus 100 elements to perform the steps described below. Further, the memory 106 may store various data recorded, detected, or otherwise generated by the tracking apparatus 100, such as current and previous geographic locations of the tracking apparatus 100, current and previously sensed conditions, operational characteristics of the tracking apparatus 100, etc. Further, the various data stored within the memory 106 may be associated within a database to facilitate retrieval of information by the processor 102. The memory 106 may store the various data either long term, for later downloading as will be discussed in greater detail below, or short term, until it has been processed and/or transmitted.

The sensor 108 is coupled with the processor 102 and is operable to sense an ambient condition, an animal condition, a tracking apparatus 100 condition, and/or other conditions. Upon sensing a condition, the sensor 108 is operable to provide a signal and/or data corresponding to the sensed condition to the processor 102 for utilization and/or for storage within the memory 106. Preferably, the sensor 108 is operable to continuously sense conditions such that the processor 102 may be provided with accurate condition information.

To sense an ambient condition, the sensor 108 may include an ambient temperature sensor to sense the temperature of the air surrounding the tracking apparatus 100, an ambient humidity sensor to sense the humidity of the air surrounding the tracking apparatus 100, a liquid sensor to sense if the tracking apparatus 100 is dry, wet, or submerged in water, etc.

To sense the condition of the animal to which the tracking apparatus 100 is coupled, otherwise referred to as an animal condition, the sensor 108 may include an animal temperature sensor 108 to sense the temperature of the animal, a biometric sensor to sense other biometric characteristics of the animal such as heart rate, breathing rate, and/or perspiration, an orientation sensor such as a tilt-compensated three-axis compass, gyroscope, tilt sensor, or level switch to determine the orientation of the housing 116 and the posture of the animal, a movement sensor such as an accelerometer to determine the velocity and/or acceleration of the animal independent of the location determining component 104, etc.

To sense an apparatus condition, the sensor 108 may include a monitor for monitoring the remaining capacity of the power source 114, a first contact sensor to sense if the housing 116 is in appropriate contact with an animal collar or harness, a second contact sensor to sense if the housing 116 is intact or damaged, a signal sensor coupled with one or both of the communications elements 110, 112 to sense the strength of a received signal, etc.

As should be appreciated, the sensor 108 may include any combination or sensing elements to sense a plurality of ambient, animal, and apparatus conditions. For instance, the sensor 108 may include a heart rate sensor, an orientation sensor, a temperature sensor, etc. Further, in some embodiments the sensor 108 may be integral with other tracking apparatus 100 elements, such as the processor 102 or location determining component 104.

The primary communications element 110 is coupled with the processor 102 and is operable to transmit information and/or data from the tracking apparatus 100 to at least one external device. Preferably, the primary communications element 110 is operable to transmit the current geographic location of the tracking apparatus 100 to the portable navigation unit 200. However, the primary communications element 110 may be operable to transmit data and information, including the current geographic location of the tracking apparatus 100, to any external device.

The primary communications element 110 is preferably operable to transmit data and information over substantial distances, such as a distance greater than a half mile, utilizing radio frequency signals. More preferably, the primary communications element 110 includes a VHF transmitter operable to transmit data and information on various VHF bands. Utilization of the VHF transmitter enables the tracking apparatus 100 to efficiently transmit information with limited interference over distances exceeding a half mile. However, the primary communications element 110 may utilize any radio, such as FRS or GMRS, or non-radio methods to communicate with external devices.

Preferably, the primary communications element 110 additionally includes an antenna 122 to facilitate transmission of data and information from the tracking apparatus 100. In embodiments employing the VHF transmitter, the antenna 122 preferably includes a VHF helical whip antenna to maximize the broadcast range of the primary communications element 110. However, as should be appreciated by those skilled in the art, the antenna 122 may include any antenna elements and is not limited to utilization of a VHF helical whip antenna.

As shown in FIG. 1, the antenna 122 preferably protrudes from the housing 116 to limit the size of the housing 116 while still enabling the antenna 122 to present a length suitable for transmission of data and information over significant distances. The antenna 122 is preferably removably coupled with the housing 116 and other tracking apparatus 100 elements to enable the antenna 122 to be easily replaced should it become damaged during use and to further enable the tracking apparatus 100 to be compactly transported when not in use. However, in some embodiments the antenna 122 may be permanently coupled with the housing 116 to reduce the complexity of the tracking apparatus 100. In some embodiments, the antenna 122 may also be enclosed entirely within the housing 116.

In some embodiments, the primary communications element 110 may be operable only to transmit data and information from the tracking apparatus 100 and thus is inoperable to receive data and information from external devices for bi-directional communication. However, in some embodiments the primary communications element 110 may be operable to receive information from external devices or otherwise engage in bi-directional communication. For instance, the primary communications element 110 may be operable to receive data from an external device and store the received data within the memory 106 for utilization by the processor 102. The tracking apparatus 100 may also include a speaker and receive voice communications over the primary communications element 110, such that the animal may be commanded remotely.

The secondary communications element 112 is coupled with the processor 102 and is operable to communicate with at least one external device independent of the primary communications element 110. Preferably, the secondary communications element 112 is operable to transmit and receive information to and from the navigation unit 200 independent of the primary communications element 110. More preferably, the secondary communications element 112 is operable to utilize WiFi (802.11), Bluetooth, ultra-wideband (UWB), Wi-Max, Wireless USB, ZigBee, Infrared (IR), magnetic, and/or other conventional wired or wireless data transfer protocols to efficiently transfer data between the tracking apparatus 100 and the navigation unit 200. Thus, in embodiments where the primary communications element 110 employs VHF or other radio frequency signals that are efficient for long-range communication but inefficient or ineffective for rapid data transfer, the secondary communications element 112 enables the tracking apparatus 100 and navigation unit 200 to rapidly exchange data to facilitate operation of the present invention. For instance, the secondary communications element 112 may receive data and information from the navigation unit 200 and store the received data and information within the memory 106 for utilization by the processor 102. The secondary communications element 112 may also receive data and information from the navigation unit 200 for configuration purposes.

In some embodiments, the secondary communications element 112 is operable to receive voice commands from a user. Thus, in addition to, or instead of, receiving data and information from the navigation unit 200, the secondary communications element 112 may receive information and instructions directly from a user utilizing voice recognition or other data capture elements. For instance, user speech may be detected and received by the secondary communications element 112 to function and configure the tracking apparatus 100.

In embodiments where the primary communications element 110 is operable to receive data and information from external devices such as the navigation unit 200, the secondary communications element 112 is not necessarily utilized or otherwise included as part of the tracking apparatus 100. Thus, in some embodiments the tracking apparatus 100 may rely solely on the primary communications element 110 for communication.

The power source 114 is associated with the housing 116 to provide electrical power to various tracking apparatus 100 elements. For example, the power source 14 is preferably directly or indirectly coupled with the location determining component 104, processor 102, memory 106, sensor 108, and/or communications elements 110, 112. The power source 114 may comprise conventional power supply elements, such as batteries, battery packs, fuel cells, solar cells and solar power elements, etc. The power source 114 may also comprise power chargers, conduits, connectors, and receptacles operable to receive batteries, battery connectors, or power cables. For example, the power source 114 may include both a battery to enable portable operation and a power input for receiving power from an external source, such as an electrical outlet and/or an automobile, in order to power the tracking apparatus 110 directly and/or recharge the battery.

The housing 116 houses and encloses at least portions of the processor 102, the location determining component 104, the memory 106, the sensor 108, the communications elements 110, 112, and the power source 114. Preferably, the housing 116 is substantially waterproof and formed of durable and rigid materials to enable the tracking apparatus 100 to be utilized in harsh, abusive, and potentially inclement conditions, such as those encountered outdoors while hunting.

As shown in FIG. 1, the housing 116 may present a generally elongated profile such that the longitudinal axis of the housing 116 is generally transverse to the longitudinal axis of the antenna 122 that protrudes therefrom. Utilization of an elongated housing enables the tracking apparatus 100 to be easily mounted to an animal collar, as is discussed in more detail below.

Figure 5:
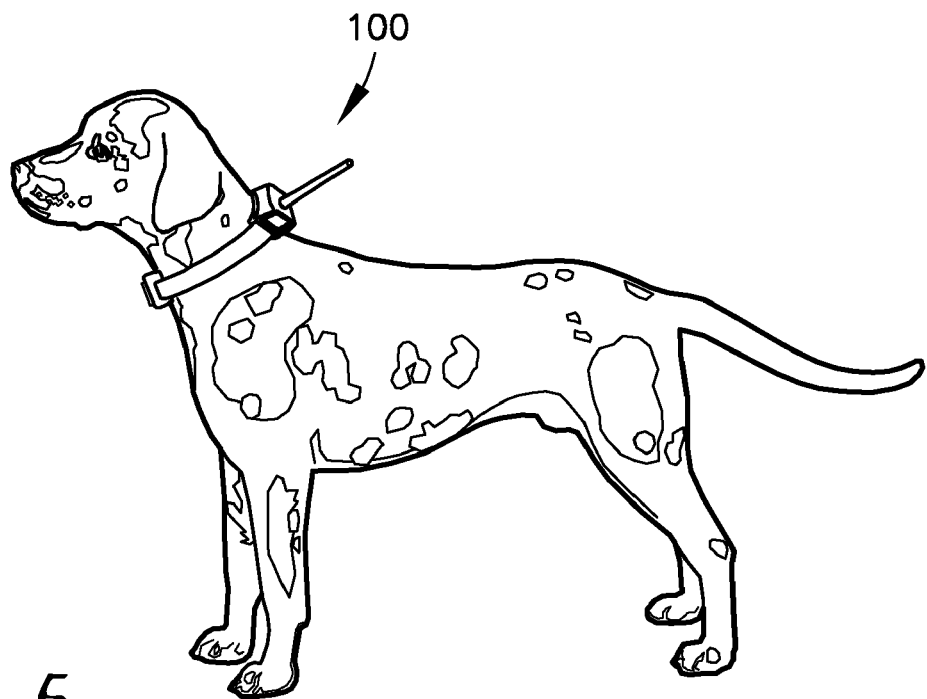
FIG. 5 is a perspective view showing the tracking apparatus of FIG. 1 coupled with a dog utilizing a dog collar.

As is also shown in FIG. 1, the housing 116 may include or be coupled with a mounting element 124. The mounting element 124 is configured for coupling with a conventional dog collar to facilitate coupling of the housing 116 to an animal. Specifically, the mounting element 124 is operable to be coupled with a conventional dog collar by positioning a portion of the dog collar through the mounting element 124 and then sliding or snapping the housing 116 into the mounting element 124 as shown in FIG. 5.

The housing 116 and the mounting element 124 may be integral such that the housing 116 may directly couple with a dog collar. However, in preferred embodiments, the housing 116 and the mounting element 124 are discrete elements as shown in FIG. 1 to enable the housing 116 to be quickly and easily removably coupled with the dog collar. For instance, the mounting element 124 may be permanently affixed to the dog collar as discussed above and the housing 116 may be coupled with the mounting element 124 only when tracking is desirable.

Referring to FIGS. 3-4, the housing 116 may also couple with or otherwise be worn by an animal such as a dog through the use of a body harness 126. The body harness 126 is a belt-like apparatus that is operable to be secured around an animal's mid-section as shown in FIG. 3. The body harness 126 may include a buckle 128 or other coupling element to secure and fit the body harness 126 to a particular animal.

The body harness 126 preferably includes a pouch 130 operable to snugly receive the tracking apparatus 100. However, in some embodiments the body harness 126 may lack the pouch 130 and the tracking apparatus 100 may be coupled with the body harness 126 utilizing other methods, such as the mounting element 124 discussed above. However, utilization of the pouch 130 is preferable as it enables the tracking apparatus to be quickly and easily coupled with the body harness 126 and associated animal. The pouch 130 may be fastened with a zipper, a hook and loop fastener, or other conventional methods.

Furthermore, the tracking apparatus 100 may be secured to the animal using both the collar and body harness 126 simultaneously. For example, the tracking apparatus 100 may be placed within the pouch 130 of the body harness 126 and may also be secured to the collar through some mounting element, such as a strap. Alternatively, the body harness 126 itself may be secured to the collar.

As shown in FIGS. 3 and 5, the configuration of the housing 116 and antenna 122 ensures that the antenna 122 is oriented properly, i.e. upwards, regardless of the general position of the animal to which the housing 116 is coupled. For instance, when the mounting element 124 is secured to an outer surface of a dog collar opposite the location of a conventional training collar element, the housing 116 may be securely coupled with the mounting element 124 such that the longitudinal axis of the antenna 122 is directed generally upward for maximum transmission range by the primary communications element 110, regardless of whether the animal to which the tracking apparatus 100 is mounted is stationary, non-stationary, sitting, standing, etc. Further, by mounting the tracking apparatus 100 opposite the training collar element, the weight of the tracking apparatus 100 is counterbalanced by the weight of the training collar element such that the tracking apparatus 100 will remain desirably positioned during potentially rapid movement by the animal.

Similarly, when the tracking apparatus 100 is secured within a portion of the pouch 130, the longitudinal axis of the antenna 122 is directed generally upward for maximum transmission range by the primary communications element 110 regardless of the particular posture or orientation of the animal to which the body harness 126 is coupled.

The Portable Navigation Unit 200

Figure 6:
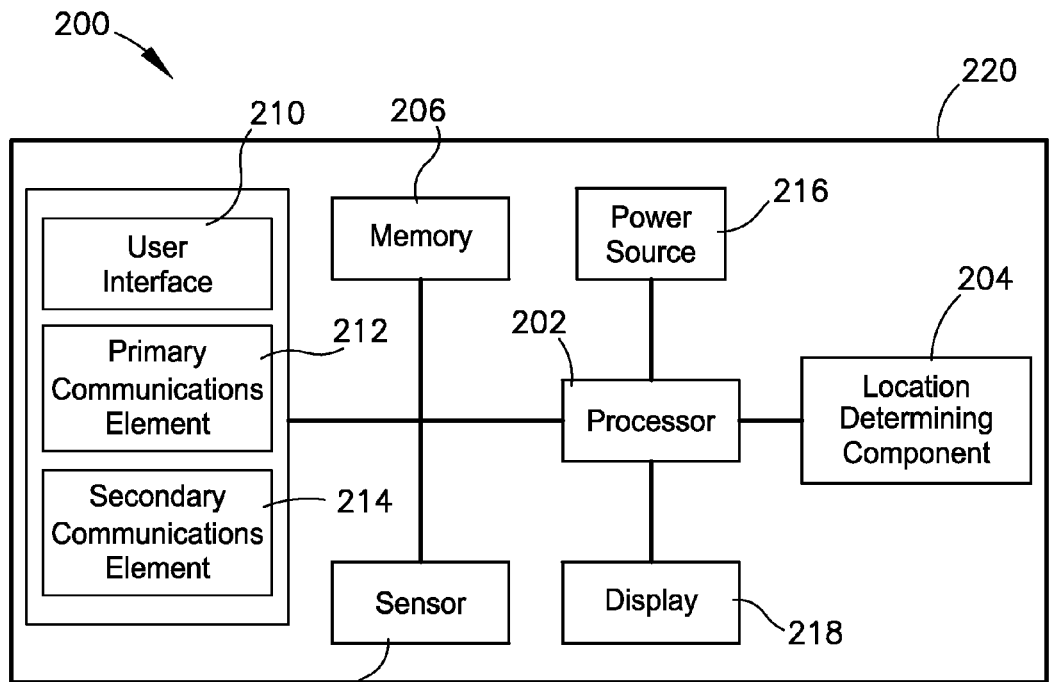
FIG. 6 is a block diagram showing some of the elements of the navigation unit of FIG. 2.

The portable navigation unit 200 is generally illustrated in FIGS. 2 and 6. The navigation unit 200 may be any portable electronic device that is operable to receive and utilize the current geographic location of the tracking apparatus 100. Thus, the navigation unit 200 may include portable computing elements, radios, televisions, portable entertainment devices, personal data assistants (PDAs), cellular telephones, etc. More preferably, the navigation unit 200 is a Global Positioning System (GPS) navigation unit manufactured by GARMIN INTERNATIONAL, INC. of Olathe, Kans. However, the navigation unit 200 may be any device configured as described herein or otherwise operable to perform the functions described below.

The navigation unit 200 preferably includes a processor 202, a location determining component 204 coupled with the processor 202 to facilitate determination of a current geographic location, a memory 206 coupled with the processor 202 and operable to store information, a sensor 208 coupled with the processor 202 and operable to sense a condition, a user interface 210, a primary communications element 212 and a secondary communications element 214 operable to communicate with at least one external device such as the tracking apparatus 100, a power source 216 for powering various unit 200 elements, and a housing 220 for housing various navigation unit 200 elements.

The processor 202, location determining component 204, and memory 206 are generally similar or identical to the processor 102, location determining component 104, and memory 106 discussed above. However, in some embodiments the processor 202, location determining component 204, and memory 206 may include additional capabilities, such as additional processing power, greater memory capacity, reduced component access time, or greater GPS precision, beyond those provided by the processor 102, location determining component 104, and memory 106 discussed above, due to the additional navigation features provided by the navigation unit 200 discussed below. For instance, memory 206 may comprise multiple memory elements, such as internal RAM, internal flash memory, and removable flash memory elements.

The sensor 208 may additionally be similar or identical to the sensor 108 discussed above. Preferably, the sensor 208 includes a tilt compensated three-axis magnetic compass operable to determine the general orientation of the navigation unit 200. Determining the orientation or heading of the navigation unit 200 facilitates tracking of the tracking apparatus 100 by providing the user with an accurate bearing to the tracking apparatus 100. In some embodiments the sensor 208 may additionally include a temperature sensor and/or a pressure sensor, such as a MEMS-based pressure sensor, to sense ambient conditions around the navigation unit 200 or to determine altitude, weather trends, etc.

The user interface 210 enables users, third parties, or other devices to share information with the navigation unit 200. The user interface 210 is generally associated with the housing 220, such as by physical connection through wires, etc, or wirelessly utilizing conventional wireless protocols. Thus, the user interface 210, or components thereof, need not be physically coupled with the housing 220.

The user interface 210 may comprise one or more functionable inputs 222 such as buttons, switches, scroll wheels, etc, a display 218 for displaying information generated by the processor 202, a touch screen associated with the display 218, voice recognition elements such as a microphone, pointing devices such as mice, touchpads, trackballs, styluses, a camera such as a digital still or video camera, combinations thereof, etc. Further, the user interface 210 may comprise wired or wireless data transfer elements such as removable memory including the memory 206, data transceivers, etc, to enable the user and other devices or parties to remotely interface with the navigation unit 200.

The user interface 210 is preferably operable to provide various information to the user utilizing the display 218 or other visual or audio elements such as a speaker. Thus, the user interface 210 enables the user and navigation unit 200 to exchange information, including tracking information, geographic entities, navigation unit and tracking apparatus configuration, security information, preferences, route information, route guidance, turn instructions, points of interests, alerts and alert notification, navigation information, waypoints, a destination address, etc.

The primary communications element 212 enables the navigation unit 200 to receive information and/or data transmitted by the tracking apparatus 100. The primary communications element 212 may be any device or combination of devices operable to receive a signal, such as a receiver coupled with an antenna. Preferably, the primary communications element 212 is compatible with the primary communications element 110 to enable the navigation unit 200 to easily receive data and information from the tracking apparatus 100. For example, in embodiments where the primary communications element 110 includes a VHF transmitter, the primary communications element 212 preferably includes a corresponding VHF receiver. However, in some embodiments, the primary communications element 212 may include a multi-band receiver and/or scanner operable to identify and receive signals transmitted on multiple frequencies or bands.

The primary communications element 212 additionally preferably comprises an antenna 224 to facilitate reception of signals transmitted by the tracking apparatus 100. In embodiments where the communications element 212 comprises a VHF receiver, the antenna 224 may comprise a VHF helical whip antenna. In a similar manner to the antenna 122 discussed above, the antenna 224 may be permanently or removably coupled with the housing 220 or be entirely enclosed therein.

Additionally, the antenna 224 may be integral or discrete with an antenna utilized by the location determining component 204. For instance, as shown in FIG. 2, the navigation unit 200 may include both the antenna 224 to receive signals from the tracking apparatus 100 and a GPS antenna 226 to receive GPS satellite signals for use by the location determining component 204 and/or processor 202.

In some embodiments, the primary communications element 212 may be operable to only receive signals transmitted by other devices, such as one or more tracking apparatus 100, and thus lack transmitting elements. However, in other embodiments the primary communications elements 212 may be operable to both receive and transmit signals. Thus, in some embodiments, the primary communications element 212 may be operable for bi-directional communication with the tracking apparatus 100.

The secondary communications element 214 is generally similar to the secondary communications element 112 discussed above and is operable to communicate with at least one external device independent of the primary communications element 212. Preferably, the secondary communications element 214 is operable to transmit and receive information to and from the tracking apparatus 100 independent of the primary communications element 212. More preferably, the secondary communications element 214 is operable to utilize WiFi (802.11), Bluetooth, ultra-wideband (UWB), Wi-Max, Wireless USB, ZigBee, Infrared (IR), magnetic, and/or other conventional wired or wireless data transfer protocols to efficiently transfer data between the tracking apparatus 100 and the navigation unit 200.

Thus, in embodiments where the primary communications elements 110, 212 employ VHF or other radio frequency signals that are efficient for long-range communication but inefficient or ineffective for rapid data transfer, the secondary communications elements 112, 214 enable the tracking apparatus 100 and navigation unit 200 to rapidly exchange data to facilitate operation of the present invention. For instance, the secondary communications element 214 may receive data and information from the tracking apparatus 100 and store the received data and information within the memory 206 for utilization by the processor 202.

In embodiments where the primary communications elements 110, 212 are operable for bi-directional communication, the secondary communications element 214 is not necessarily utilized or otherwise included as part of the navigation unit 200. Thus, in some embodiments the navigation unit 200 may rely solely on the primary communications element 212 for communication.

The display 218 is coupled with the processor 202 and/or other navigation unit 200 elements and is operable to display various information corresponding to the navigation unit 200, such as tracking information, maps, locations, and other information as is described below. The display 218 may be monochrome or color and comprise display elements including, but not limited to, CRT, LCD, and/or plasma devices. As described above, the display 218 may include a touch-screen display to enable the user to interact with the display 218 by touching or pointing at display areas to provide information to the navigation unit 200.

The power source 216 is associated with the housing 220 to provide electrical power to various navigation unit 200 elements. For example, the power source 216 may be directly or indirectly coupled with the user interface 210, location determining component 204, processor 202, memory 206, communications elements 212, 214, and/or display 218. The power source 216 may comprise conventional power supply elements, such as batteries, battery packs, fuel cells, solar cells and solar elements, etc. The power source 216 may also comprise power chargers, conduits, connectors, and receptacles operable to receive batteries, battery connectors, or power cables. For example, the power source 216 may include both a battery to enable portable operation and a power input for receiving power from an external source, such as an electrical outlet and/or an automobile, in order to power the navigation unit 200 directly and/or charge the battery.

The housing 220 is preferably handheld or otherwise portable to facilitate transport of the navigation unit 200 between locations. More preferably, the housing 220 is comprised of generally conventional, substantially waterproof, and durable materials, such as ABS, other plastics, metals, etc, to protect the enclosed and associated elements when the navigation unit 200 is utilized in harsh, abusive, and potentially inclement conditions such as those encountered while hunting.

Steps 100-108

Figure 13:
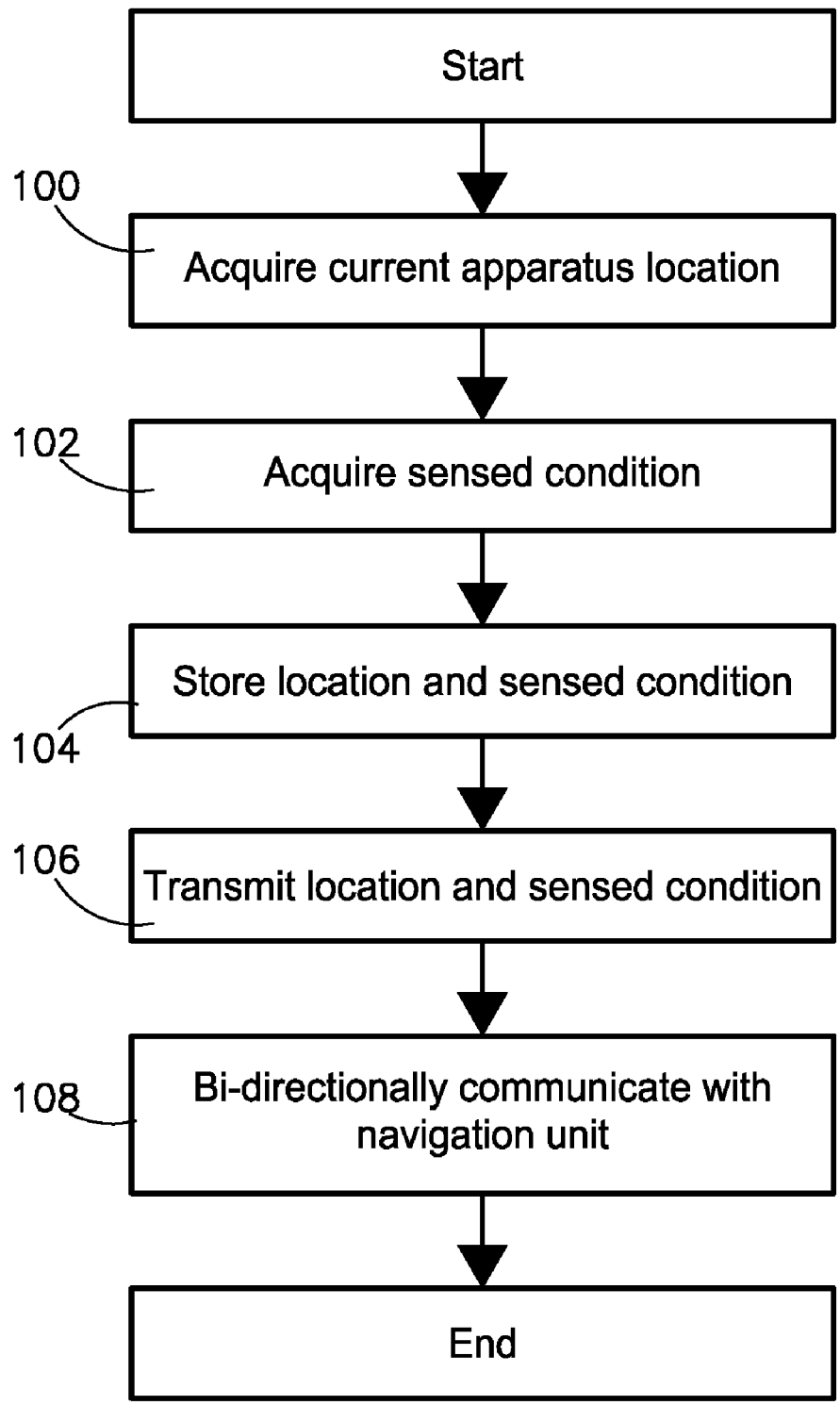
FIG. 13 is a flow chart showing various steps operable to be performed by the tracking apparatus of FIG. 1.

Steps 100-108 shown in FIG. 13 generally illustrate various functions operable to be performed by various embodiments of the tracking apparatus 100. Steps 100-108 generally include: acquiring a current geographic location, referenced at step 100; acquiring a sensed condition, referenced at step 102; storing the acquired location and sensed condition, referenced at step 104; transmitting the acquired location and sensed condition, referenced at step 106; and bi-directionally communicating with the navigation unit 200, referenced at step 108.

Steps 100-108 may be performed in any order and are not limited to the specific order described herein. Further, steps 100-108 may be performed simultaneously or concurrently such that the steps are not necessarily sequential. Further, steps 100-108 are not each necessarily performed by all embodiments of the present invention.

At start, typically upon being powered up, the tracking apparatus 100 will receive setup instructions from the navigation unit 200 over the secondary communications element 112. For example, the tracking apparatus 100 may be instructed to change channel(s) or transmit time slot(s) as necessary to effectively communicate with the navigation unit 200. However, especially where the secondary communications element 112 is not included, such communications may be conducted over the primary communications element 110.

In step 100, the current geographic location of the tracking apparatus 100 is acquired. The tracking apparatus 100 is secured, mounted, or otherwise coupled with an animal as discussed above. The current geographic location of the tracking apparatus 100, and thus the animal to which the tracking apparatus 100 is mounted, is preferably acquired and determined as described above utilizing the location determining component 104. Thus, for instance, the current geographic location may be determined in step 100 by receiving GPS signals and computing the current geographic location from the received GPS signals.

The current geographic location of the tracking apparatus 100 may be continuously acquired to ensure that the processor 102 is provided with an accurate representation of the location of the tracking apparatus 100 even when the tracking apparatus 100 is in motion. In some embodiments, the geographic location may be acquired at a user-defined or pre-defined interval, such as every thirty seconds, every minute, etc, to conserve the power source 114 and lengthen the time in which the tracking apparatus 100 may be utilized for tracking. Alternatively, also to converse power, the geographic location may be acquired only when the motion sensor detects motion indicating that the previously acquired geographic location is no longer accurate.

As is described above, the current geographic location may be acquired and determined utilizing other methods, such as by retrieving the current geographic location from the memory 106 or from one or both of the communications elements 110, 112. Similarly, the processor 102 may calculate the current geographic location of the tracking apparatus 100 utilizing information and data stored within the memory 106.

In step 102, a sensed condition is acquired. Preferably, the sensed condition is acquired by the tracking apparatus 100 using the sensor 108. For instance, the sensor 108 may continuously or at regular intervals sense a condition and generate signals, data, or other information corresponding to the sensed condition. In some embodiments, the condition may be sensed and/or acquired at a user-defined or pre-defined interval, such as every thirty seconds, every minute, etc, when the motion sensor detects motion, or when the sensed condition has changed to conserve the power source 216 and lengthen the time in which the tracking apparatus 100 may be utilized for tracking.

The sensed condition preferably corresponds to a sensed ambient condition, animal condition, and/or tracking apparatus 100 condition. For instance, as discussed above, the sensed condition may include an ambient temperature, a remaining power level, an orientation of the tracking apparatus 100, etc. Preferably, the sensed condition acquired in step 102 corresponds to a sensed animal condition, such as a temperature of the animal or the posture of the animal, such as if the animal is sitting, standing, stationary, or non-stationary. As should be appreciated, any combination of conditions may be sensed by the sensor 108 for acquisition in step 102.

In some embodiments, the combination of the processor 102 and sensor 108 may acquire one or more sensed conditions. For instance, the sensor 108 may acquire the orientation of the housing 116 and the processor 102 may determine the posture of the animal based on the acquired orientation. Further, the processor 102 may use a combination of information acquired from the location determining component 104, the memory 106, and the sensor 108 to acquire an ambient, animal, apparatus condition. For example, the processor 102 may compare a currently sensed condition to a previously sensed condition, utilize information acquired from the sensor 108 and the location determining component 104 to determine the status, posture, or movement of the animal, etc. In some embodiments, such as those lacking the sensor 108, step 102 is not necessarily performed and sensed conditions are not necessarily acquired.

In step 104, information relating to the current geographic location of the tracking apparatus 100 acquired in step 100 and the sensed condition acquired in step 102 is stored within the memory 106. The geographic locations and conditions are stored within the memory 106 for later use and analysis by the processor 102, the navigation unit 200, and/or the user. In some embodiments, step 104 may be performed each time step 102 is performed such that every acquired location and condition is stored within the memory 106. However, in other embodiments, step 104 may be performed at intervals less than step 100 and 102 such that geographic locations and sensed conditions are recorded within the memory 106 every 15 seconds, 30 seconds, 1 minute, etc.

Preferably, step 104 is performed more than once such that a database or other organized listing of geographic locations and corresponding sensed conditions may be formed or otherwise stored within the memory 106. By storing a plurality of geographic locations and sensed conditions within the memory 106, the user and/or the navigation unit 200 may later analyze the stored data for tracking or training purposes in step 108. For example, the stored geographic locations and corresponding conditions may be transmitted, via the communications elements 110, 112 to the navigation unit 100 and/or other devices, such as a personal computer (PC). Similarly, in embodiments where the memory 106 is removable, the user may remove the memory 106 and couple the memory 106 with a computing element, such as the PC, or the navigation unit 200 to further analyze the stored geographic locations and corresponding conditions.

Additionally, in embodiments where step 102 is not performed and sensed conditions are not acquired, step 104 may include only storing the current geographic location acquired in step 100 within the memory 106. Further, in some embodiments, step 104 does not need to be performed, such that steps 106 and 108 may be performed by dynamically acquiring the current geographic location and the sensed condition.

In step 106, information relating to the current geographic location of the tracking apparatus 100 acquired in step 100 and the sensed condition acquired in step 102 is transmitted. Preferably, the primary communications element 110 transmits the current geographic location of the tracking apparatus 100 and the sensed condition to the navigation unit 200 for utilization by the user. Utilization of the primary communications element 110 to transmit the current geographic location of the tracking apparatus 100 and acquired sensed condition enables external devices, such as the navigation unit 200, to receive the transmitted information and data from significant ranges, such as those greater than a half mile. Such a configuration enables the animal to be coupled with the tracking apparatus 100 and accurately and easily tracked from remote distances utilizing the navigation unit 200 or other devices, as is discussed below in more detail.

Step 106 may include continuously transmitting the current geographic location of the tracking apparatus 100 and the sensed condition to enable the navigation unit 200 to be provided with the most accurate information available. However, the current geographic location and the sensed condition are preferably transmitted only at user-defined or pre-defined intervals, such as every 5 seconds, 10 seconds, 15 seconds, 30 seconds, 1 minute, 5 minutes, etc, to conserve the power source 114. Specifically, by transmitting information with the primary communications element 110 only at specific intervals, the power consumption of the tracking apparatus 100 is greatly decreased, thereby increasing the time period over which the tracking apparatus 100 may be utilized to track the animal. Further, in most situations, the user's ability to track the animal is not damaged by periodic transmission of information from the tracking apparatus 100 as the animal is unlikely or unable to move great distances between transmissions. Alternatively, or additionally, the tracking apparatus 100 may transmit the current geographic location and sensed condition upon being polled by the navigation unit 200 and/or when the current geographic location and/or sensed condition has changed.

Further, in embodiments where a plurality of geographic locations and corresponding sensed conditions are stored within the memory 106 in step 104, step 106 may include transmitting a plurality of geographic locations and sensed conditions simultaneously or in rapid sequence. Thus, for instance, every sixty seconds the primary communications element 212 may transmit all geographic locations and sensed conditions that were stored within the memory 206 within the previous sixty seconds. Such a configuration reduces power consumption as discussed above while still allowing the navigation unit 200 to receive comprehensive information regarding the tracking apparatus 100.

As should be appreciated, in embodiments where step 102 is not performed and no sensed condition is acquired, step 106 may include transmission of the current geographic location only. Similarly, in some embodiments the primary communications element 212 may alternately transmit the current geographic location acquired in step 100 and the sensed condition acquired in step 102 to conserve the power source 114.

Preferably, the primary communications element 110 is utilized to transmit the information and/or data in step 106. However, in some embodiments it may be desirable to transmit the current geographic location of the tracking apparatus 100 and sensed condition utilizing the secondary communications element 112, such as where the navigation unit 200 and tracking apparatus 100 are in close proximity and rapid transfer of information is desirable.

In step 108, the tracking apparatus 100 may bi-directionally communicate with the navigation unit 200 or other external devices. Preferably, the secondary communications element 112 is utilized to bi-directionally communicate with the navigation unit 200 to send and receive data and information therefrom. For instance, the user may use the navigation unit 200 to transmit configuration information, control instructions, navigation information, tracking information, or any other data to the tracking apparatus 100. The secondary communications element 112 may receive the transmitted information, process the received information utilizing the processor 102, and/or reply to the received information by transmitting reply information utilizing the secondary communications element 112. In some embodiments, as discussed above, the primary communications element 110 may be utilized to bi-directionally communicate with the navigation unit 200 or other external devices.

For example, the user may program or configure the tracking apparatus 100, such as by setting the transmission interval discussed in step 106, by sending instructions that are received by the secondary communications element 112. Similarly, the navigation unit 200 or other external devices may retrieve information from the memory 106, such as previous locations and conditions of the tracking apparatus 100, through bi-directional communication with the tracking apparatus 100. Such a configuration enables the tracking apparatus 100 to be easily programmed in the field or other remote locations and also enables the user to easily and quickly retrieve data and information acquired by the tracking apparatus 100.

Steps 200-210

Figure 14:
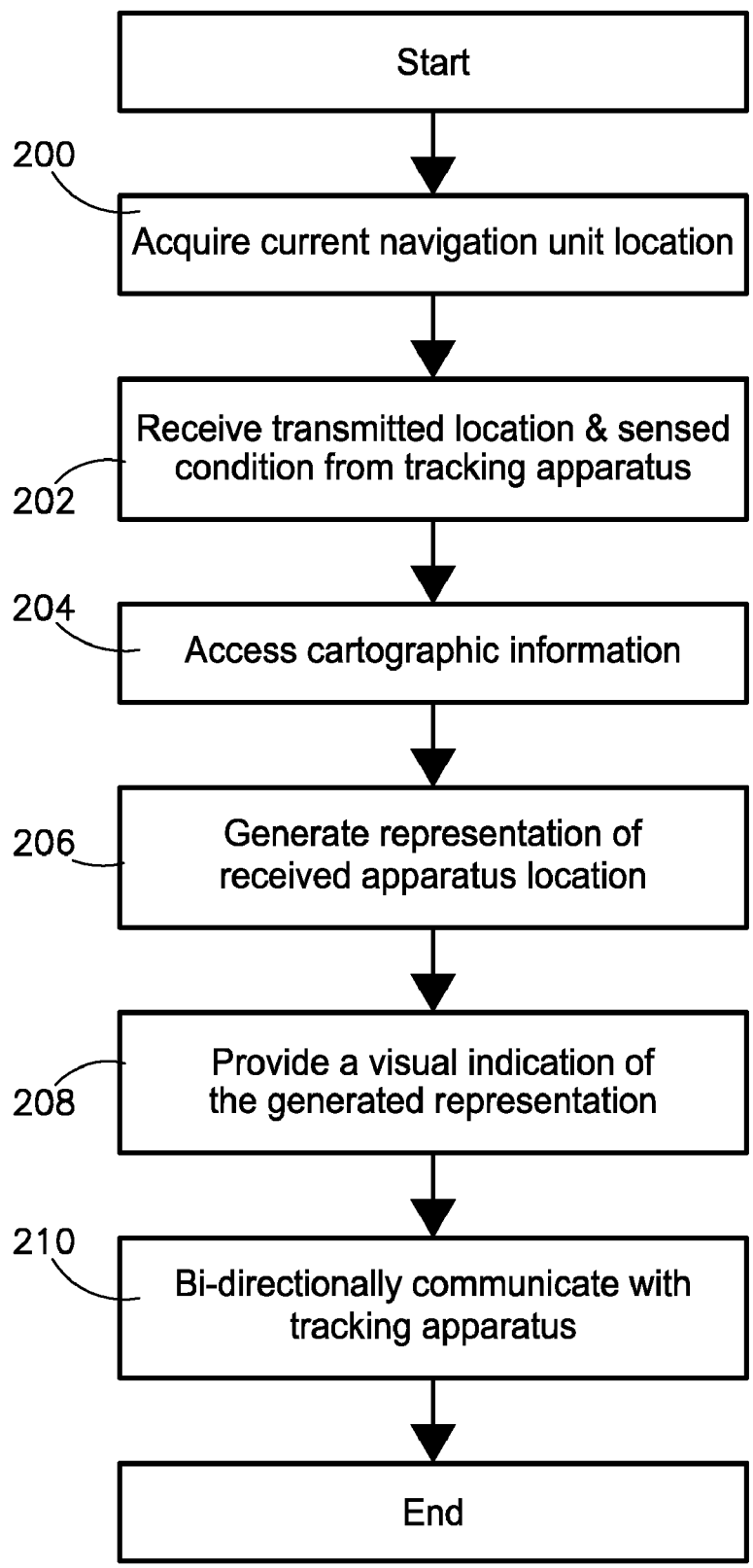
FIG. 14 is a flow chart showing various steps operable to be performed by the navigation unit of FIG. 2.

Steps 200-210 shown in FIG. 14 generally illustrate various functions operable to be performed by various embodiments of the navigation unit 200. Steps 200-210 generally include: acquiring a current geographic location of the navigation unit 200, referenced at step 200; receiving transmitted information from the tracking apparatus 100, referenced at step 202; accessing cartographic information, referenced at step 204; generating a representation of the received tracking apparatus 100 location, referenced at step 206; displaying the generated representation, referenced at step 208; and bi-directionally communicating with the tracking apparatus 100, referenced at step 210.

Steps 200-210 may be performed in any order and are not limited to the specific order described herein. Further, steps 200-210 may be performed simultaneously or concurrently such that the steps are not necessarily sequential. Further, steps 200-210 are not each necessarily performed by all embodiments of the present invention.

At start, typically, upon being powered up, the navigation unit 200 will attempt to transmit setup instructions to the tracking apparatus 100 over the secondary communications element 214. For example, the navigation unit 200 may instruct the tracking apparatus 100 to change channel(s) or transmit time slot(s) as necessary. Alternatively, the navigation unit 200 may change channel(s) or transmit time slot(s) as necessary to effectively communicate with the tracking apparatus 100. The navigation unit 200 may attempt to establish communications with the tracking apparatus 100 on command from the user, continuously until it does so, or may make periodic checks for an available tracking apparatus 100. Especially where the secondary communications element 214 is not included, such communications may be conducted over the primary communications element 212.

In step 200, the navigation unit 200 acquires its current geographic location. Preferably, the navigation unit 200 acquires its current geographic location utilizing the location determining component 204 in a similar manner to that discussed above in step 100 regarding the tracking apparatus 100. For instance, at a continuous or regular interval the location determining component 204 and/or processor 202 may compute the current location of the navigation unit 200 utilizing received GPS signals. In some embodiments, the geographic location may be acquired at a user-defined or pre-defined interval, such as every thirty seconds, every minute, etc, or upon sensing a change to conserve the power source 216 and lengthen the time in which the navigation unit 200 may be utilized for tracking.

However, the current geographic location may be determined utilizing other methods, such as by retrieving the current geographic location from the memory 206, the user interface 210, and/or from an external device or source utilizing the communications elements 212, 214. For example, the current geographic location may be determined by allowing the user to select his or her location from a map or listing presented by the display 218.

In step 202, information transmitted by the tracking apparatus 100 is received. Preferably, the navigation unit 200 utilizes the primary communications element 212 to receive transmitted information and/or data corresponding to the current geographic location of the tracking apparatus 100 and one or more conditions sensed by the tracking apparatus 100.

As discussed above in step 106, the primary communications elements 110, 212 are preferably compatible such that the navigation unit 200 may easily receive information transmitted by the tracking apparatus 100. For instance, the primary communications element 212 may be tuned to correspond to the broadcast frequency and/or channel of the primary communications element 110, or visa versa.

In some embodiments, the navigation unit 200 may receive the transmitted information utilizing the secondary communications element 214 instead of, or in addition to, the primary communications element 212. For instance, in some embodiments the primary communications element 212 and secondary communications element 214 may be integrated into a single receiver. However, as discussed above, the tracking apparatus 100 information is preferably transmitted by the tracking apparatus 100 utilizing radio frequency signals such that the primary communications element 212 is configured to receive the broadcast radio signals to enable efficient and long-range tracking of the animal.

Preferably, the primary communications element 212 continuously monitors appropriate or selected frequencies for transmitted information to ensure that the animal may be accurately tracked. However, to conserve the supply of the power source 216, some embodiments of the navigation unit 200 may receive transmitted signals only a pre-defined or selected intervals corresponding to tracking apparatus broadcast intervals.

Data corresponding to the information received from the tracking apparatus 100, such as the current and previous geographic locations of the tracking apparatus 100 and one or more sensed conditions, is preferably stored within the memory 206 for use by the processor 202 and/or user. All information and data received from the tracking apparatus 100 may be stored within the memory 206 in an ordered listing or database to enable full tracking analysis. However to reduce required memory capacity, in some embodiments, only portions of all received data and information are stored within the memory 206, such as the locations and conditions received within the last two hours, or any other interval, from the tracking apparatus 100.

In step 204, cartographic information is accessed. Preferably, the memory 206 is operable to store cartographic information such as maps, terrain and elevation information, points of interest, street and thoroughfare information, navigation information, or any other information corresponding to various locations, and the processor 202 is operable to access the memory 206 and cartographic information according to the current geographic location of the tracking apparatus 100 received in step 202.

For instance, the processor 202 may utilize the received current geographic location of the tracking apparatus 100, access a database of cartographic information stored within the memory 206, and retrieve cartographic information corresponding to the tracking apparatus 100 location such as a map of the area surrounding the tracking apparatus 100 location. Similarly, the processor 202 may access cartographic information corresponding to previously acquired geographic locations or predicted future locations of the tracking apparatus 100.

In some embodiments, the navigation unit 200 accesses cartographic information stored on other devices in step 204. For example, the secondary communications element 214 may access the Internet or other external devices to retrieve cartographic information corresponding to the acquired tracking apparatus 100 location.

Preferably, the navigation unit 200 accesses cartographic information each time information is received from the tracking apparatus 100. Such a configuration ensures that the processor 202 is operable to generate accurate representations of the area in proximity to the tracking apparatus 100 in step 206. However, to conserve navigation unit 200 resources, in some embodiments cartographic information may be accessed only a certain intervals, such as every 15 seconds, 30 seconds, etc.

In steps 206 and 208, a representation of the received tracking apparatus location 100 is generated and then displayed to the user. Preferably, the processor 202 generates a representation of the received tracking apparatus location 100 utilizing the current geographic location of the navigation unit 200, the sensed condition received in step 202, and/or the cartographic information accessed in step 204. The display 218 is utilized to display the generated representation to the user.

Figure 10:
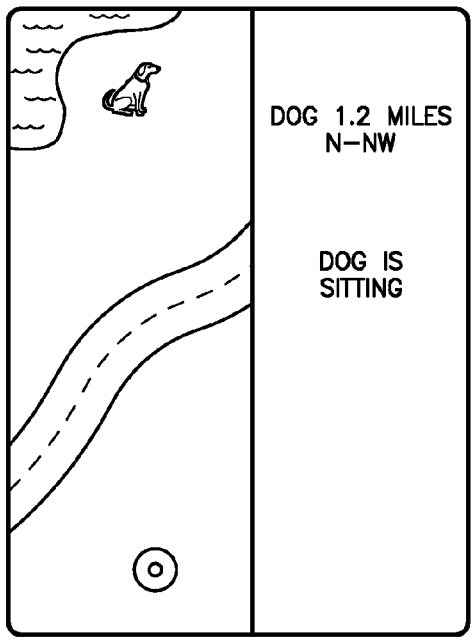
FIG. 10 is a sample screen display of the navigation unit of FIG. 2, the sample screen display showing the absolute location of a tracked animal and a sensed condition.
Figure 11:
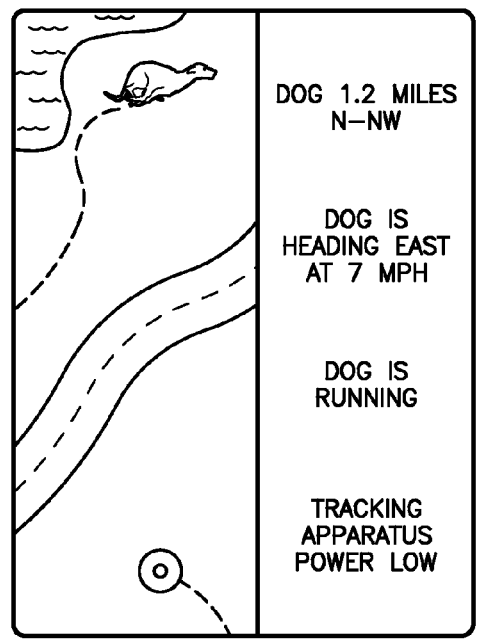
FIG. 11 is a sample screen display of the navigation unit of FIG. 2, the sample screen display showing the absolute location of a tracked animal and a sensed condition.
Figure 12:
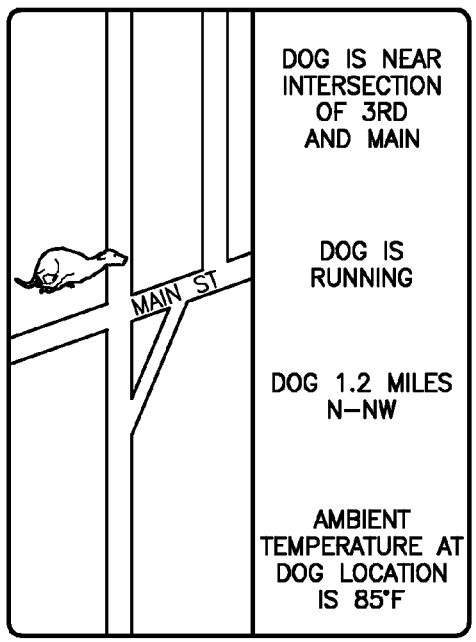
FIG. 12 is a sample screen display of the navigation unit of FIG. 2, the sample screen display showing the absolute location of a tracked animal and a sensed ambient condition at the absolute location.

In some embodiments, the processor 202 is operable to generate a representation of the tracking apparatus 100 location utilizing the cartographic information acquired in step 204. For instance, as shown in FIG. 12, the processor 202 may generate a representation of the tracking apparatus 100 or animal that is coupled therewith on a map to enable the user to easily identify the location of the animal and tracking apparatus 100. The representation of the current location of the tracking apparatus 100 may be provided independent of the current location of the navigation unit 200 such that the absolute position of the tracking apparatus 100 is provided. "Absolute position" as utilized herein refers to a position or location that is not dependent on the location of the navigation unit 200, such as the "intersection of 3rd and Main" shown in FIG. 12, a particular latitude or longitude, or a position of the tracking apparatus 100 on a map as shown in FIGS. 10 and 11.

Utilization of absolute positions to represent the location of the tracking apparatus 100, in contrast to purely relational representations based on the current location of the navigation unit 200, enables the user to quickly and easily identify the location of the animal utilizing cartographic information, such as landmarks, street intersections, etc, instead of purely relational information which may be of limited value to the user independent of cartographic information.

As discussed above, the cartographic information may additionally or alternatively include terrain and elevation information. Consequently, the processor 202 may generate a representation of the tracking apparatus 100 and animal showing the animal on grass, near water, at a certain elevation, on a path, on a road, etc. Such terrain and elevation information further assists the user in tracking the animal by providing the user additional information regarding the animal's current location. As should be appreciated, any cartographic information accessed by the navigation unit 200 may be utilized to generate and display the representation of the current geographic location of the tracking apparatus 100.

The generated and displayed information may also include a representation of the current navigation unit 200 geographic location acquired in step 200. For instance, as shown in FIGS. 10-11, the current geographic location of the navigation unit 200 may be displayed independently of the current geographic location of the tracking apparatus 100 utilizing the cartographic information. By representing absolute unit and apparatus locations utilizing cartographic information, the user may easily identify his or her own location, the location of the animal, and the best route from the current navigation unit location to the current tracking apparatus location. Further, in some embodiments the processor 202 may generate a route to the current tracking apparatus 100 location utilizing the accessed cartographic information.

The generated and displayed representation may also include relational information regarding the current and previous locations of the tracking apparatus 100 and navigation unit 200. For instance, as shown in FIGS. 10-12, the generated and displayed representation may include information such as the bearing, direction, and/or distance to the tracking apparatus 100 from the navigation unit 200. Utilization of both relational and absolute location information enables the user to efficiently track the animal based on cartographic or directional information.

In some embodiments, the generated and displayed representation may also include supplemental tracking information formed utilizing a plurality of received tracking apparatus 100 locations. For instance, the supplemental tracking information may include the speed and acceleration of the tracking apparatus 100, a plot or display of previous tracking apparatus 100 locations, a projected future path or route of the tracking apparatus 100 and/or animal, the direction, bearing, or heading of the tracking apparatus 100, etc.

In embodiments where the tracking apparatus 100 transmits data or information corresponding to a sensed condition, the generated and displayed representation preferably includes an indication of the sensed condition. For instance, as shown in FIGS. 10-12, the representation may indicate the sensed condition utilizing text and/or numerals, such as a description of the animal's posture or temperature, ambient conditions such as air temperature, apparatus 100 conditions such as power source 114 capacity, or any other conditions discussed above. Further, the sensed condition may be represented utilizing a graphical indication, such as an image of a dog sitting or running, or an audible indication, such as voice information relating to the acquired status information.

In step 210, the navigation unit 200 bi-directionally communicates with the tracking apparatus 100 utilizing the secondary communications element 214 as discussed above in step 108. For instance, the navigation unit 200 may send instructions, data, tracking information, and configuration information to the tracking apparatus 100 for use and the navigation unit 200 may receive data and information generated by the tracking apparatus 100 such as tracking apparatus 100 locations and sensed conditions. The display 218 may be utilized to provide a visual indication of the data and information acquired from the tracking apparatus 100, such as a plot of the path taken by the animal wearing the tracking apparatus 100 over a certain time period, charts, graphs, and other representations of acquired tracking apparatus locations and sensed conditions, and comparisons between data acquired from the secondary communications element 214 and data stored within the memory 206. As discussed above, the navigation unit 200 and tracking apparatus 100 may also or alternatively bi-directionally communicate by utilizing the primary communications elements 110, 212.

As should be appreciated, steps 200-210 discussed above may be employed in addition to conventional navigation device features, such as route calculation, etc., to enable the navigation unit 200 to perform generally conventional navigation functions in addition to the functions performed by steps 200-210.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An animal tracking apparatus operable to be worn by an animal wearing a collar and a body harness, the apparatus comprising:
    a location determining component to determine an apparatus location;
    a sensor operable to sense a posture of the animal wearing the animal tracking apparatus, wherein the sensed posture is one of and distinguishable among sitting, standing, stationary, or non-stationary;
    a primary communications element coupled with the location determining component, the primary communications element transmitting information relating to the apparatus location and the animal posture to a remote navigation unit to output the location and distinguishable posture to a user; and
    a housing to house at least portions of the location determining component, the sensor, and the primary communications element, the housing removably coupling with both the collar and the body harness.

2. The apparatus of claim 1, further including an antenna coupled with the primary communications element to facilitate transmission of the information relating to current geographic location to the remote navigation unit, wherein the antenna is secured to the housing.

3. The apparatus of claim 2, wherein the housing is removably coupled with an outer surface of the dog collar and the longitudinal axis of the antenna is generally transverse to the outer surface when the housing is coupled thereto.

4. The apparatus of claim 2, wherein the housing is removably coupled with a portion of the body harness and the longitudinal axis of the antenna is generally transverse to the portion when the housing is coupled thereto.

5. The apparatus of claim 4, wherein the portion comprises a pouch and the housing is secured within the pouch.

6. The apparatus of claim 1, further including a secondary communications element to transmit and receive information from the remote navigation unit independent of the primary communications element.

7. The apparatus of claim 1, further including a processor and a memory, the processor being coupled with the location determining component, the memory, and the primary communications element, the processor storing information corresponding to the apparatus location in the memory.

8. An animal tracking system comprising:
    an animal tracking apparatus operable to be worn by an animal, the animal tracking apparatus including—
        a Global Positioning System (GPS) receiver to determine an apparatus location,
        a sensor to sense a posture of the animal; wherein the posture is one of and distinguishable among one of sitting, standing, stationary and non-stationary,
        a memory to store the apparatus location and the sensed posture,
        a primary communications element to transmit information relating to the apparatus location and the sensed posture, and
        a housing to house at least portions of the GPS receiver, the sensor, the memory, and the primary communications element; and
    a portable navigation unit including—
        a GPS receiver to determine a unit location,
        a primary communications element to receive the information from the animal tracking apparatus,
        a processor coupled with the receiver and the primary communications element, the processor to generate a representation of the apparatus location independent of the unit location, and a display to display the generated representation of the apparatus location and the sensed distinguishable posture.

9. The system of claim 8, wherein the processor generates a representation of the current geographic location of the unit and the display displays the unit location and the apparatus location simultaneously.

10. The system of claim 8, wherein the primary communications element of the apparatus transmits information relating to the apparatus location to the primary communications element of the unit utilizing radio frequency signals.

11. The system of claim 8, wherein the sensor is operable to sense a condition selected from the group consisting of an animal condition, an ambient condition, and an apparatus condition.

12. The system of claim 11, wherein the sensed condition is selected from the group consisting of an ambient temperature, an ambient humidity level, and whether the apparatus is wet or dry.

13. The system of claim 11, wherein the sensed condition is selected from the group consisting of an orientation, a temperature, a heart rate, and combinations thereof.

14. The system of claim 11, wherein the sensed condition is selected from the group consisting of a power capacity, whether the apparatus is being worn, whether the apparatus is damaged, and a received signal strength.

15. The system of claim 8, wherein the apparatus and the unit each include a secondary communications element to provide bi-directional communication between the apparatus and the unit independent of the primary communications element.

16. The system of claim 15, wherein the secondary communications element utilizes a short-range wireless communication protocol.

17. The system of claim 9, wherein the apparatus further includes a harness to the housing adjacent the animal's midsection.

18. The system of claim 8, wherein the navigation unit further includes a tilt compensated three-axis compass coupled with the processor to determine a heading of the navigation unit.

19. An animal tracking system comprising:
an animal tracking apparatus operable to be worn by an animal, the animal tracking apparatus including—
a Global Positioning System (GPS) receiver to determine an apparatus location,
a sensor to sense a posture of and distinguishable among the animal, wherein the sensed posture is one of sitting, standing, stationary, or non-stationary,
a memory to store the apparatus location and the sensed posture,
a long range communications element to transmit information relating to the apparatus location and the sensed posture,
a short range communications element, independent of the long range communications element, to receive configuration information, and
a housing to house at least portions of the GPS receiver, the sensor, the memory, and the communications elements; and
a portable navigation unit including—
a GPS receiver to determine a unit location,
a memory including cartographic data,
a long range communications element to receive the information from the animal tracking apparatus,
a short range communications element, independent of the long range communications element, to transmit the configuration information, and
a display to display a representation of the apparatus location, the sensed distinguishable posture, and the unit location,
wherein the portable navigation device is operable to calculate a route from the location of the portable navigation unit to the location of the animal tracking apparatus using the cartographic data and present a representation of the calculated route on the display.

20. The apparatus of claim 1, wherein the sensor includes at least one of a compass, a gyroscope, a tilt sensor, a level switch, or an accelerometer.

21. The system of claim 8, wherein the sensor includes at least one of a compass, a gyroscope, a tilt sensor, a level switch, or an accelerometer.

22. The system of claim 19, wherein the sensor includes at least one of a compass, a gyroscope, a tilt sensor, a level switch, or an accelerometer.

23. The system of claim 8, wherein the portable navigation unit further comprises memory including cartographic data and the portable navigation unit is further operable to:
calculate a route from the location of the portable navigation unit to the location of the animal tracking apparatus using the cartographic data; and
present a representation of the calculated route on the display.

* * * * *